(12) United States Patent
Chen

(10) Patent No.: US 8,700,867 B2
(45) Date of Patent: Apr. 15, 2014

(54) INTEGRATED STORAGE CONTROLLER AND APPLIANCE METHOD AND SYSTEM

(75) Inventor: Jyh-shing Chen, Cary, NC (US)

(73) Assignee: NetApp, Inc., Sunnyvale, CA (US)

( * ) Notice: Subject to any disclaimer, the term of this patent is extended or adjusted under 35 U.S.C. 154(b) by 446 days.

(21) Appl. No.: 12/772,106

(22) Filed: Apr. 30, 2010

(65) Prior Publication Data

US 2011/0271062 A1    Nov. 3, 2011

(51) Int. Cl.
*G06F 13/00* (2006.01)

(52) U.S. Cl.
USPC .................. 711/154; 711/E12.002; 718/104

(58) Field of Classification Search
USPC ...................... 711/154, E12.002; 718/104
See application file for complete search history.

(56) References Cited

U.S. PATENT DOCUMENTS

| | | | |
|---|---|---|---|
| 2010/0199275 A1* | 8/2010 | Mudigonda et al. | 718/1 |
| 2010/0257583 A1* | 10/2010 | Ngo et al. | 726/1 |
| 2011/0126203 A1* | 5/2011 | Fahrig | 718/102 |
| 2011/0239213 A1* | 9/2011 | Aswani et al. | 718/1 |

OTHER PUBLICATIONS

Intel Virtualization Technology for Directed I/O, Feb. 20, 2009, http://software.intel.com/en-us/articles/intel-virtualization-technology-for-directed-io-vt-d-enhancing-intel-platforms-for-efficient-virtualization-of-io-devices/.*

* cited by examiner

*Primary Examiner* — Edward Dudek, Jr.
(74) *Attorney, Agent, or Firm* — LeClairRyan, a Professional Corporation

(57) ABSTRACT

An integrated data center combines a storage controller and appliances onto a computer platform. Storage controller component executes on the computer platform with exclusive access to a first storage controller host bus adapter coupled to a storage shelf A virtualized instance of the hardware from the computer platform is provisioned to deliver application services from an appliance component which may share the processing resources from the computer platform through different virtual machines. An appliance host bus adapter from the computer platform is exclusively associated to the appliance component. This provides the appliance component exclusive control of the appliance host bus adapter passing through the virtualized instance of the hardware. To access the storage devices, appliance host bus adapter and corresponding appliance component are coupled with a second storage controller host bus adapter associated with the storage controller component.

21 Claims, 5 Drawing Sheets

INTEGRATED STORAGE CONTROLLER AND APPLIANCE METHOD AND SYSTEM

INTRODUCTION

Aspects of the present invention concern storage and virtualization.

In the area of computing, virtualization masks applications from most aspects of the underlying hardware of the computer platform. Virtualization can also make a single instance of a resource such as a processor, memory or display device appear as multiple logical instances for use by applications executing in their own virtual environment. This virtual environment is often referred to as a "virtual machine" because the virtual machine appears to be a complete computer platform to each application.

Enterprises have adopted virtualization for a certain class of applications that demand a separate execution environment within the computer platform but only an occasional need for all the available processing power. Separate execution environments generally isolate users and the applications from interfering with each other even when they execute on the same computer platform. For example, an application running in one virtual machine will not interact with the identical application running on another virtual machine on the same computer platform. This logical separation allows the consolidation of multiple servers onto fewer servers and utilization of any remaining unused processing power. It is also is advantageous as denser server farms can be created with lower amounts of overall power consumption and space requirements.

Unfortunately, the storage class of applications have been slow to adopt virtualization due to higher throughput and performance requirements. For example, conventional virtualization involves emulating storage and other devices in software to complement the virtualized processing environment. These emulated storage and other devices may accurately simulate a device but introduce latency and performance limitations. In "cloud computing" and other enterprise solutions, the increased latency and lower performance resulting from virtualization is not acceptable. Accordingly, high-end storage systems for large enterprises and "cloud computing" solutions generally use hardware-based solutions to get the required level of performance and responsiveness. These enterprises find it more advantageous to implement storage systems using multiple storage controllers, storage racks and computer systems than attempt to virtualize storage hardware and share their resources.

BRIEF DESCRIPTION OF THE DRAWINGS

The features of the present invention and the manner of attaining them, and the invention itself, will be best understood by reference to the following detailed description of embodiments of the invention, taken in conjunction with the accompanying drawings, wherein.

SUMMARY OF THE INVENTION

Figure 1:
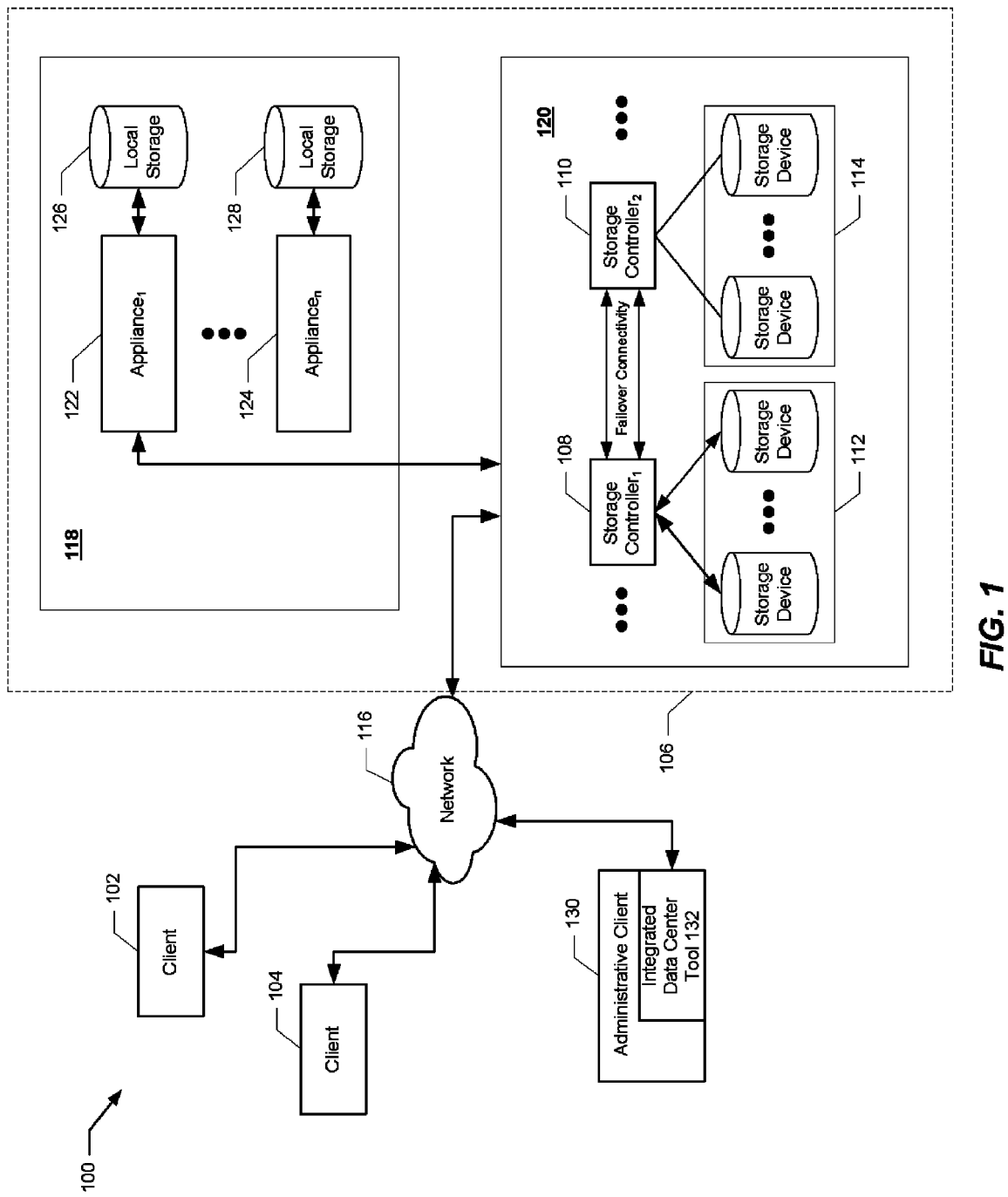
FIG. 1 is a schematic block diagram of an exemplary system providing storage controller and appliances implemented in accordance with aspects of the present invention.

Aspects of the present invention provide a method of integrating a storage controller and one or more appliances onto a computer platform. In one implementation, the method and system initially configures a storage controller component to execute on a computer platform. The storage controller component accesses a first storage controller host bus adapter coupled to a storage shelf having one or more storage devices. Next, the method and system provisions a virtualized instance of the hardware from the computer platform to deliver application services from an appliance component. In this manner, the appliance component from multiple different applications may share the resources from the computer platform through multiple different virtualized instances of the hardware or virtual machines. With respect to storage, aspects of the present invention exclusively associate an appliance host bus adapter from the computer platform to each appliance component. This aspect of the present invention provides the appliance component exclusive control of the appliance host bus adapter passing through the virtualized instance of the hardware. To access the storage devices, the appliance host bus adapter associated with the virtualized instance of the hardware and corresponding appliance component is coupled with a second storage controller host bus adapter associated with the storage controller component. Aspects of the present invention then enable the access to the storage controller component and storage devices from each appliance host bus adapter. The appliance component accesses the storage devices passing data through the appliance host bus adapter and then though the first and second storage controller host bus adapters.

DETAILED DESCRIPTION

Aspects of the present invention improve utilization of storage devices and related hardware while limiting the impact to overall performance. Benefits provided by aspects of the present invention include, but are not limited to, one or more of the following mentioned herein below. First, a high-performance storage controller and appliance for delivering applications may be implemented on a single computer platform. This is useful in creating rapid storage solutions without multiple pieces of complex and difficult to configure hardware. The storage controller and appliances may run together on the computer platform within virtual machines that can be readily configured and reconfigured. This makes it easier to deploy a solution while not sacrificing throughput made available to the appliances through high-speed HBA and connections to storage devices.

As storage requirements increase, aspects of the present invention may be scaled up with few reengineering or reconfiguration requirements. This is particularly important in delivering "cloud computing" solutions where the storage system may grow quickly over a short time period. Generally, "cloud computing" solutions deliver Software as a Service (SaaS) over the Internet or intranet rather than delivering shrink-wrap software to be installed on a user's computer.

These storage systems must be scalable and easy to upgrade as SaaS systems are often in continuous use over the Internet and cannot be taken down.

Indeed, if a storage controller needs more processing power then a new computer platform is added. The additional computer platform is shared among various applications as virtualized appliances running within corresponding virtual machines. In accordance with aspects of the present invention, each appliance from the newly added computer platform is exclusively associated with an HBA and connected with the storage controller HBA thus using the underlying hardware and storage shelves at high speed. Because aspects of the present invention scales well, entry level and high-end storage systems implemented in accordance with aspects of the present invention will have similar per unit throughput and performance.

Storage systems solutions can be more easily configured and tested using aspects of the present invention. Administrative software tools designed in accordance with aspects of the present invention can configure and load different storage controllers and appliances together on predetermined computer platforms with varying sizes and performance characteristics. The configuration tools can transform these computer platforms into high-end storage system with integrated appliances and storage controllers with high throughput and performance characteristics. Enterprises can quickly implement and test different implementation by loading applications on virtual machines and not different hardware. Sales and technical teams also benefit as the administrative software tools can also be used to quickly setup a customized storage controller and appliance environment for proof of concept and/or migration or upgrade purposes.

FIG. 1 is a schematic block diagram of an exemplary system 100 providing integrated storage controller and appliances implemented in accordance with aspects of the present invention. System 100 in FIG. 1 includes clients 102/104, administrative client 130, integrated data center 106 delivering applications from appliances 118 and storage from storage system 120. Integrated data center 106 uses virtualization in accordance with aspects of the present invention making it is possible to deliver appliances 118 and storage system 120 on a single computer platform sharing storage and processing power. In effect, while appliances 118 and storage system 120 in FIG. 1 appear as a discrete set of components, they are in fact virtualized and may run on a single computer platform. For example, appliances 118 in FIG. 1 may appear to include a discrete a set of appliances 122 through 124 and corresponding local storage 126 through 128 but these in fact may be virtualized and run on the shared hardware from an underlying computer platform.

Integrated data center 106 may be implemented on a single computer platform with a single chassis holding one processor complex (i.e., single/multiple core, multiple processors), memory, a single local storage, a network connection and bus having one or multiple HBA devices. As described in further detail later herein, each appliance 118 executes within virtual machine and associated exclusively with dedicated HBAs providing high-speed connectivity to storage system 120. Storage system 120 has dedicated HBAs providing high-speed storage access to the storage shelves 112/114 yet may run on the hardware of the computer platform or within a virtual machine. Accordingly, integrated data center 106 of the present invention utilizes computing resources from a single computer platform efficiently while also delivering high-performance storage access.

Appliance$_1$ 122 through Appliance$_n$ 124 may each have their own respective local storage such as local storage 126 and local storage 128. For example, local storage 126 may be used to hold local variables, state information and a bootable image for rapidly booting each appliance. It can be appreciated that local storage 126 and 128 are preferably provisioned from a single local storage device and virtualized in accordance with aspects of the present invention as further described herein below. It is also contemplated that local storage 126 can be individual hard drives or flash memory associated with each virtual machine running appliance 122 through 124. Each appliance may be configured to deliver application services includes functionality selected from a set of application services including: Exchange electronic-mail (email) services, POP/Imap email, web-based email services, document management services, electronic commerce services, advertising related services and Social networking services. Alternate implementations of the present invention can be applied to the delivery of essentially any application service that might benefit from the efficiencies of sharing a computer platform using virtualization.

Clients 102/104 may be computers, smartphones, laptops, palmtops, touchpads, tablets or other computer-like devices capable of accessing applications and storage from integrated data center 106 either directly or indirectly over a network 116. Network 116 may include the Internet, intranets and any combination of one or more other networks including storage area networks or SAN. In general, clients 102/104 may access storage system 120 using wireless or wired connections supporting one or more point-to-point links, shared local area networks (LAN), wide area networks (WAN) or other access technologies. In general, clients 102/104 may be accessing data, applications, raw storage or various combinations thereof from integrated data center 106.

Storage system 120 includes one or more storage controllers and storage shelves represented by the pair of storage controllers 108 and 110 and their corresponding storage shelves 112 and 114. The storage controller's function is to process storage operations and manage the data being stored and retrieved on the storage devices within each storage shelf. Later herein, the storage controller is separately identified as the storage controller component as it shares execution on the computer platform with appliance components associated with the appliances.

It is the storage controller component that imparts the storage controller functionality through either a virtual machine running on the computer platform or upon the hardware of the computer platform. For example, storage controller 108 executes a storage controller component providing file and block access to the organization of information on storage devices, such as disks, within storage shelf 112. Storage controller component may include a storage operating system that implements a file system to logically organize the information as a hierarchical structure of directories and files on the disks. Each "on-disk" file may be implemented as a set of disk blocks configured to store information, such as text, whereas the directory may be implemented as a specially-formatted file in which information about other files and directories are stored. Each storage system is capable of directly accessing both files and blocks stored on a storage device typically used in conjunction with network attached storage (NAS) or storage area networks (SAN).

As used herein, the term storage operating system generally refers to the computer-executable code operable within a storage environment that manages data access and client access requests and may implement file system semantics in implementations involving filers or other storage systems. In this sense, the Data ONTAP® storage operating system, available from NetApp®, Inc. of Sunnyvale, Calif., which implements a Write Anywhere File Layout® (WAFL®) file system, is an example of such a storage operating system implemented as a microkernel within an overall protocol stack and associated disk storage. Alternatively, the storage operating system may include clusters of the Data ONTAP® storage operating system. The storage operating system can also be implemented as an application program operating over a general-purpose operating system, such as UNIX® or Windows®, or as a general-purpose operating system with configurable functionality, which is configured for storage applications as described herein.

In one implementation, storage shelves 112 and 114 may be implemented using storage disks having one or more storage volumes to define an overall logical arrangement of storage space. Some storage implementations can serve a large number of storage volumes that may exceed 150 discrete units, for example. A storage volume is "loaded" in storage controller 108 or 110 by copying the logical organization of the volume's files, data and directories into memory of storage controller 108 or 110. Once a volume has been loaded in memory of a storage system, the volume may be "mounted" by one or more users, applications, or devices as long as they are permitted to access its contents and navigate its namespace. As used herein, a volume is said to be "in use" when it is loaded in a filer's memory and at least one user, application, etc. has mounted the volume and modified its contents.

Each file and directory stored in a filer is typically identified by a file-handle identifier or "file handle." A file handle generally includes at least a volume identifier (V), a file identifier (F) and a generation number (G) that collectively describe a specific file or directory in the filer. The volume identifier indicates which storage volume in the filer contains the file or directory. The file identifier identifies the specific file or directory in the volume. For example, if the volume implements an inode-based file system, such as the WAFL® file system, the file identifier may correspond to an inode number of a file or directory within the volume. The generation number identifies a particular instance of the file or directory in the volume. For instance, if different versions of the same file are stored in the volume, each may be differentiated from the others by its corresponding generation number. In general, the largest generation number for a file or directory corresponds to its most recent version. It is contemplated that file handles may also include other information besides a volume identifier, file identifier and generation number. Accordingly, it is further contemplated that a variety of different file-handle implementations are envisioned to be within the scope of the present invention.

As illustrated in FIG. 1, storage controllers like storage controller 108 may be configured to operate according to a client/server model of information delivery thereby allowing multiple clients, such as client 102 and client 104, to access files simultaneously. In this model, client 102 may be a computer running one or more applications from appliances 118, such as an Exchange® server or electronic-commerce transaction that connects to storage system 120 over a network 116 with one or more network protocols, such as point-to-point links, shared LAN, WAN, or VPN as implemented over a public network such as the Internet. Communications between storage controller 108 and client 102 is typically embodied as packets sent over the network 116. Each client may request the services from an application on appliances 118 or directly request storage from storage system 120 by issuing file-system protocol messages formatted in accordance with a conventional file-system protocol, such as the Common Internet File System (CIFS) or Network File System (NFS) protocol. Alternate protocols for accessing storage from storage system 120 include using SCSI (Small Computer System Interface) over iSCSI (Internet Small Computer System Interface), FCoE (Fibre Channel over Ethernet) or FC (Fiber Channel).

For example, client 102 and client 104 are configured to communicate with a file-access protocol engine of storage system 108 using a stateful or stateless file-system protocol. A stateful protocol, such as CIFS protocol, is a connection-oriented protocol that requires storage system 120, e.g., the file-access protocol engine, and client 102 and client 104 to establish a communication session (or "virtual circuit") through which they exchange information. Each communication session is then associated with session-specific "state" information, which may include, inter alia, authentication information, session identifiers, file-handle identifiers, and other related information. In the event the session is lost or interrupted, the state information for the communication session may be used to reestablish the session without having to re-authenticate client 102, client 104 or other clients as well as renegotiate many of the session parameters. Upon re-establishing the stateful-protocol session, storage system 120 typically invalidates the client's outstanding file handles and issues a new set of file handles to the client. Thus, any client requests that were lost as a result of the session failure can be "replayed" by client 102, client 104 using the new set of file handles.

In contrast, a stateless protocol, such as the NFS protocol, does not require establishment of a formal communication session. Instead, requests from client 102, client 104 or other clients in a stateless protocol are authenticated and processed by the storage system 108 on a per-request basis rather than a per-session basis. That is, the validity of a client request in a stateless protocol is not bound to the duration of any specific communication session. Thus, unlike file handles used in stateful protocols, file handles in stateless protocols may remain valid even after the storage system has been temporarily shutdown or disabled.

In operation, administrative client 130 includes software and tools to configure and manage the integrated data center 106 in accordance with aspects of the present invention. In particular, an integrated data center tool 132 creates the integrated data center 106 from a computer platform having a processor(s), memory and other hardware along with the requisite number of HBA devices. While the integrated data center tool 132 is part of administrative client 130 in one implementation, it is contemplated that integrated data center tool 132 may alternatively be incorporated as a management tool within appliances 118, storage system 120, integrated data center 106 or within a combination of these various components.

As described in further detail later herein, the integrated data center tool 132 creates virtualized appliances by assigning one or more virtual machines to execute one or more applications. In addition, the integrated data center tool 132 determines which of the appliances 122 through 124 demand high speed data transfer and thus need to be given exclusive association with an HBA from the computer platform. The HBA associated with the appliance is also connected to an HBA associated with a storage controller device such as storage controller 108. By automating the configuration and virtualization operations, integrated data center tool 132 makes it much easier to deploy storage systems and appliances integrated together on a computer platform and in accordance with the present invention.

Once the integrated data center 106 is created, clients 102/104 may execute applications from appliances 118 that access storage through storage controllers within storage system 120. Based on performance characteristics, it appears to clients 102/104 that appliance 122 through appliance 124 are each executing on separate computer platforms having high-speed access to storage system 120 at throughput rates associated with the respective HBA devices used in the storage system 120. However, instead of multiple computer platforms, aspects of the present invention may virtualize only a single computer platform to provide both application services from appliances 118 and high-performance storage from storage system 120. To guard against failure of the computer platform, a secondary computer platform may be utilized for storage controller 110. Accordingly, storage controller 110 and storage shelf 114 would preferably be external to integrated data center 106 on a separate computer platform having a high-speed connection between storage controller 110 and storage controller 108 in the event of failure. In one implementation, the high-speed connection updates instructions and status of NVRAM (non-volatile random access memory) in both storage controller 110 and 108 should one of the storage controllers fail and need to perform a failover sequence.

Figure 2:
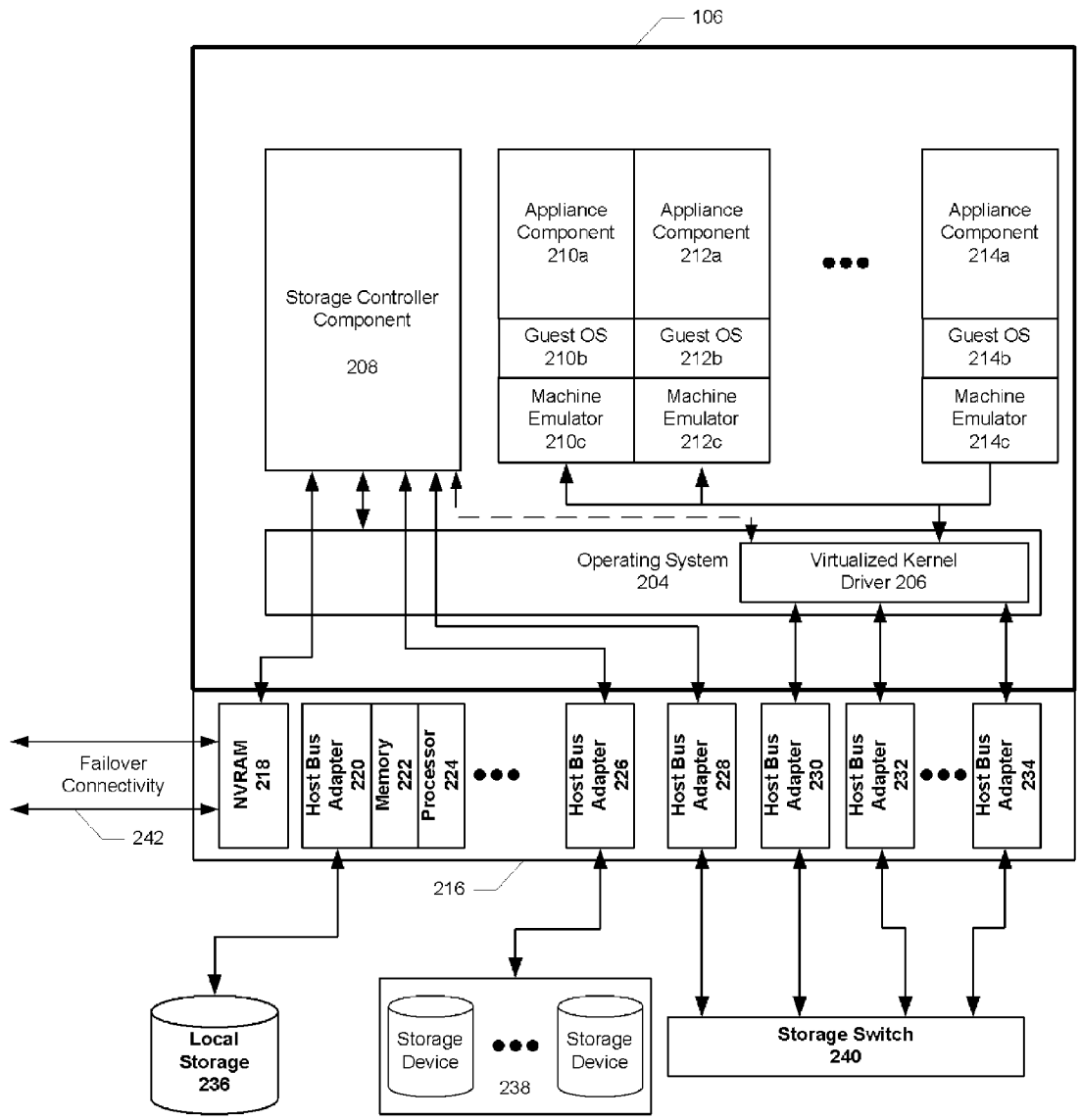
FIG. 2 is a schematic block diagram of integrated data center that may be advantageously implemented in accordance with aspects of the present invention.

FIG. 2 is a schematic block diagram of integrated data center 106 that may be advantageously implemented in accordance with the present invention. Integrated data center 106 illustrates details of implementing both a storage system and appliances on a single computer platform while maintaining high throughput performance between the appliances and storage system.

In one implementation of integrated data center 106, the computer platform includes hardware 216, operating system 204, storage controller component 208, appliance component 210a, and appliance component 212a through appliance component 214a. Storage controller component 208 may execute on the hardware 216 of the computer platform under the control of operating system 204 while instances of the appliance component run on virtualized instances of the kernel as provided for by virtualized kernel driver 206. Alternatively, storage controller component 208 might execute on a guest OS and machine emulation (not shown) within a virtualized instance of hardware 216 as indicated by the "dotted" line connection between storage controller component 208 and virtualized kernel driver 206.

For increased flexibility, appliance component 210a, 212a through 214a can execute on different guest operating systems (OSs) compiled for different underlying processor architectures. Guest OS 210b provides the proper operating system environment and support matching the target OS in which appliance component 210a was developed. Likewise, guest OS 212b through guest OS 214b also provide the proper operating system to match appliance component 212a through 214a. For example, executing an instance of Microsoft Exchange® Server as appliance component 210a might require guest OS 210b to be an appropriate version of the Windows operating system. In comparison, guest OS 212b might be an instance of Apple® OS X operating system and Appliance component 212a might be one or more various Apple applications. Appliance component 214a might be an application for a smartphone such as the Palm® Pre™ and the guest OS 214b would be the Palm® WebOS® operating system. In general, guest operating system may include both real-time and non-real time compatible operating systems selected from a set of operating systems including: Linux, Solaris x86, FreeBSD, BSD, Windows®, MacOS®, Unix®, VMWare® ESX/ESXi, and Data ONTAP®.

Aspects of the present invention also allows execution binary code for different processors. If hardware 216 uses an x86 compatible processor 224, machine emulator 210c and 212c may be able to execute binary code from guest OS 210b and 212b with little or no modification provided they are both x86 compatible operating systems. However, if guest OS 214b is targeted for a non-x86 processor like the ARM® processor then machine emulator OS 214c must translate instructions from guest OS 214b to the underlying x86 executable instruction set to maintain compatibility with processor 224. For example, QEMU is one open-source machine emulator that performs binary translation of the instructions from a guest OS and appliance component to be executed on processor 224.

Operating system 204 may generally be the FreeBSD or Linux operating systems but could be other operating systems provided there is support for execution of machine emulators 210c, 212c, 214c or native storage controller component 208. If operating system 204 is the FreeBSD operating system then storage controller component 208 should be executable within the FreeBSD environment. In particular, storage controller component 208 may include Data ONTAP® operating system used to manage storage from storage shelf 238 and storage devices contained therein.

Within operating system 204, virtualized kernel driver 206 performs virtualization of the operating system and underlying hardware as supported by processor 224. By loading the virtualized kernel driver 206, the operating system 204 becomes a hypervisor operating system that virtualizes the operating system and hardware for other types of operating systems to execute upon. KVM (kernel virtual machine) is one open source virtualized kernel driver 206 that provides a "guest" mode for executing other operating systems in a separate address space.

Each guest operating system is loaded for execution in the operating system 204 through virtualized kernel 206 and appears as a different process in the operating system 204 under virtualized kernel driver 206. In this case, storage controller component 208 may be compatible with the FreeBSD or Linux operating systems and run on operating system 204 and not need virtualized kernel driver 206. While not illustrated in FIG. 2, an alternative implementation may also have storage controller component 208 executing within a guest OS and machine emulator as previously discussed.

Virtualization support for these and other features are available on Intel® Virtualization Technology for Directed I/O (VT-d) featured processors and AMD® Vi featured processors. Both the Intel and AMD processor lines support passing a guest virtual machine giving exclusive use peripheral devices such as Ethernet, accelerated graphic cards and HBAs through a feature referred to as input/output memory management unit or IOMMU. The IOMMU effectively allows a virtual machine to obtain exclusive use of hardware through a combination of direct memory addressing (DMA) and interrupt remapping.

Virtualized kernel driver 206 works with operating system 204 to present a virtualized instance of hardware 216 with the exception of the HBAs. To deliver high-throughput data, HBAs from the hardware 216 of the computer platform are associated exclusively with an appliance component through a virtualization layer. These HBAs may also be referred to as appliance HBAs as the exclusive association provides each appliance component with control over the HBA's usage.

In the implementation illustrated in FIG. 2, HBA 230, HBA 232 through HBA 234 are associated with appliance component 210a, 212a through 214a through virtualized kernel driver 206. HBAs, characterized as appliance host bus adapters operatively couple each appliance component with the storage controller component. In this example implementation, appliance HBA 230, 232 through 234 are connected with the storage controller HBA 228. Typically multiple appliance HBAs are connected with storage controller HBA 228 through an external storage switch 240 compatible with one or more protocols and interface standards including SCSI, iSCSI, Serial-attached SCSI (SAS), Fibre Channel (FC), Fiber Channel over Ethernet (FCoE), ATA over Ethernet (AoE), SATA, eSATA, IDE, Ethernet, FireWire, Universal Serial Bus (USB), and InfiniBand.

Storage controller HBA 228 makes a high speed connection to the storage controller component 208. Data passes through storage controller component 208 and then onto storage rack 238 through another storage controller HBA 226. Both storage controller HBA 228 and storage controller HBA 226 are associated exclusively with the storage controller component. Aspects of the present invention virtualize memory 222, processor 224 and other elements of the hardware 216 yet connects the HBAs to the application component 210a, 212a and 214a and storage controller component 208 to maintain the high data throughput performance.

An additional direct connection between NVRAM 218 and the NVRAM from another storage controller (not illustrated in FIG. 2) is useful for implementing failover recovery procedures. NVRAM 218 provides fault-tolerant backup of data, enabling the integrity of storage system transactions to survive a service interruption based upon a power failure, or other fault. The size of the NVRAM 218 is variable, although it is typically sized sufficiently to log a certain time-based chunk of transactions (for example, several seconds worth). The NVRAM 218 may store client requests corresponding to discrete client messages requesting file transactions such as "WRITE," "CREATE," "OPEN," and the like. Further, these entries may be logged in the NVRAM, typically according to the particular order they are completed. The use of the NVRAM for system backup and crash recovery operations is generally described in commonly assigned application Ser. No. 09/898,894, entitled "System and Method for Parallelized Replay of an NVRAM Log in a Storage Appliance" by Steven S. Watanabe et al. assigned to the assignee of the present invention and expressly incorporated herein by reference.

It is contemplated that aspects of the invention described herein may apply to any type of special-purpose computer (e.g., file serving appliance) or general-purpose computer, including a standalone computer, embodied as a storage environment. To that end, storage system 120 may be broadly, and alternatively, referred to as a component of the integrated data center 106. Moreover, various aspects of the invention can be adapted to a variety of storage environment architectures including, but not limited to, a network-attached storage (NAS) environment, a storage area network (SAN) and disk assembly directly-attached to a client/host computer. The term "storage environment" should, therefore, be taken broadly to include such arrangements and combinations thereof.

In the illustrative implementation in FIG. 2, memory 222 includes storage locations addressable by processor 224 and adapters for storing software program code and data. For example, memory 222 may include a form of random access memory (RAM) that is generally cleared by a power cycle or other reboot operation and classified as "volatile" memory. Processor 224 and various adapters may, in turn, comprise processing elements and/or logic circuitry configured to execute the software code and manipulate the data stored in the memory 222. Operating systems 204, portions of which may be resident in memory and executed by processor 224, functionally organizes storage by, inter alia, invoking storage operations in support of a storage service implemented by storage controller component 208. While storage controller component 208 may operate alone, it is also contemplated that the component may execute within operating system 204 and virtualized kernel driver 206 or other virtualization environments that help improve utilization and efficient allocation of hardware and computing resources.

In one implementation, the storage shelf 238 includes storage devices arranged into a plurality of volumes, each having a file system associated therewith. The volumes may each include one or more disks. Implementations of the present invention configure the disks of storage devices into RAID groups so that some disks store striped data and at least one disk stores separate parity for the data, in accordance with a preferred RAID 4 configuration. However, other configurations (e.g. RAID 5 having distributed parity across stripes, RAID 0 mirroring and others) are also contemplated. In a typical implementation, a volume is implemented as a multiplicity of RAID groups. Local storage 236 and HBA 220 may be virtualized and used to meet local storage requirements for removing storage controller component 208 and appliance components 210a, 212a, and 214a through virtualization kernel driver 206.

Figure 3:
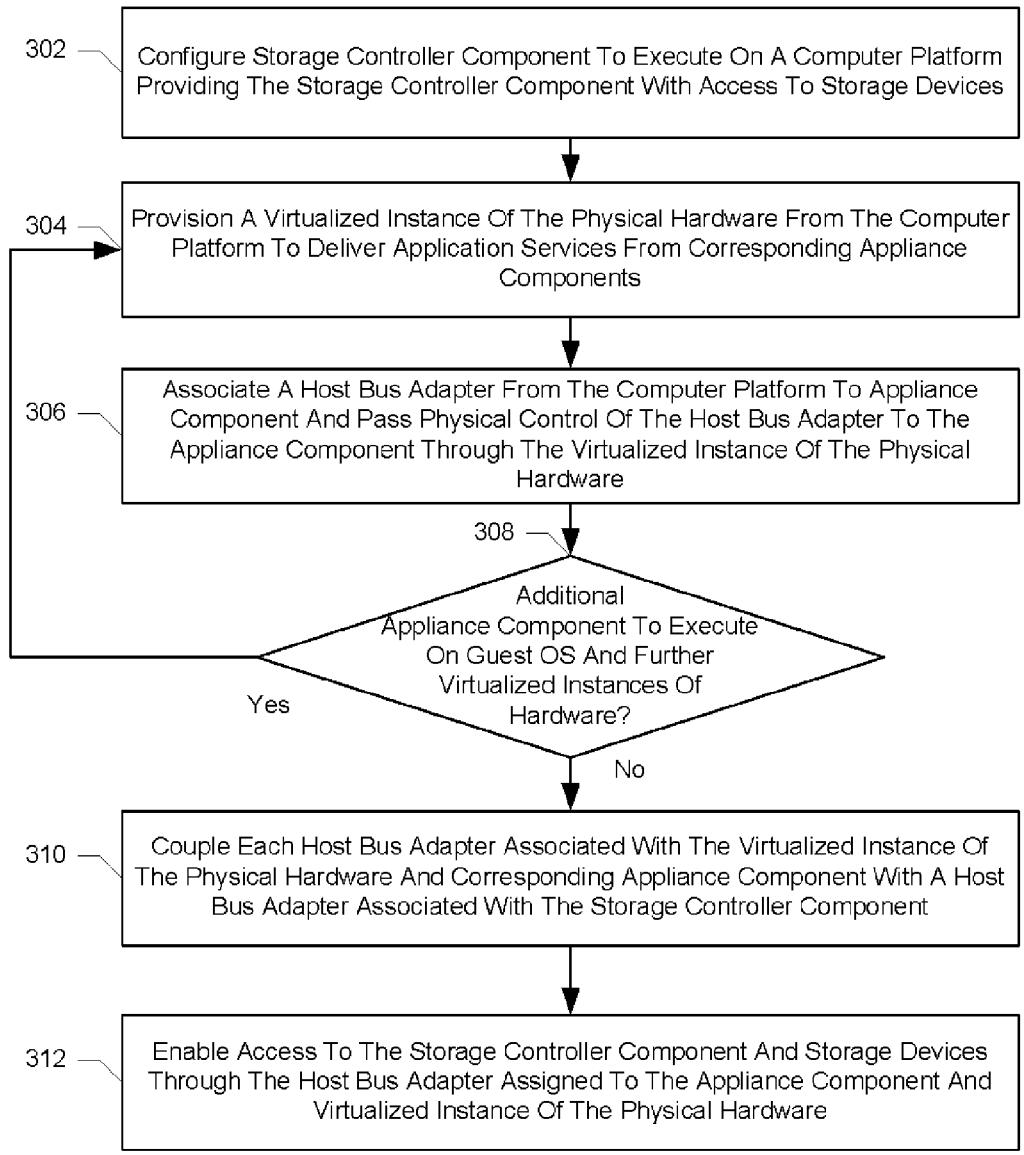
FIG. 3 is a flowchart diagram providing the operations for configuring the storage controller and appliances in accordance with one implementation of the present invention.

Referring to FIG. 3, a flowchart diagram provides the operations for configuring the storage controller and appliances in accordance with one implementation of the present invention. It is contemplated that the integrated data center tool 132 in FIG. 1 could include one or more of the operations in FIG. 3 when creating the integrated data center 106. When using the integrated data center tool 132, the overall function or purpose of the integrated data center 106 can be provided to help select a preconfigured solution that loads the appropriate applications on the appliances and configures the storage controller. For example, the integrated data center 106 may be configured to operate as a packet capture appliance or "sniffer" that intercepts packets over a network and optionally decodes and analyzes its content to identify problems or security breaches. This example configuration is explained in further detail later herein. Because the appliances are implemented using virtual machines, the integrated data center tool 132 may also be used to change the purpose or overall function of the integrated data center 106 on demand by loading different "appliances" on virtual machines that deliver different applications and have different connectivity with the storage controller and other components.

In one implementation, the storage controller component is configured to execute on the hardware of a computer platform. The storage controller component uses the storage controller host bus adapter to access to one or more storage devices in a storage shelf (302). It is also contemplated that storage controller component from a storage controller may execute on a virtualized instance of the hardware from the computer platform. Virtualization may be performed using an operating system with virtualized kernel support such as the open-source KVM and hardware support from the underlying processor. For example, Intel® VT-d processors provide hardware support for virtualization of the hardware and also flexibility to form exclusive associations between I/O devices and virtual machines using the I/O pass-through features. Accordingly, in this latter virtualized implementation the storage controller HBA is not emulated by the virtualization layer but exclusively associated with the storage controller component using the I/O pass-through feature.

Next, aspects of the present invention provision a virtualized instance of the hardware from the computer platform to deliver application services from one or more appliance components. (304). This operation combines both the storage controller and appliances on a single computer platform thus increasing processing efficiencies. For each instance of an appliance, aspects of the present invention exclusively associates an HBA from the computer platform with an appliance component and passes control of the HBA to the appliance component through the virtualized instance (306). As previously described, the virtualization may be performed with virtualized kernel support such as open-source KVM provided sufficient processor support. Alternate implementations may use VMWare ESX/ESXi servers for virtualization and VMDirectPath I/O to facilitate the association of an HBA with the appliance component and virtualized instance of the hardware. An HBA from the computer platform is associated as described above and these steps repeated (304, 306, 308) for each additional appliance HBA and appliance component (308-Yes).

Figure 4:
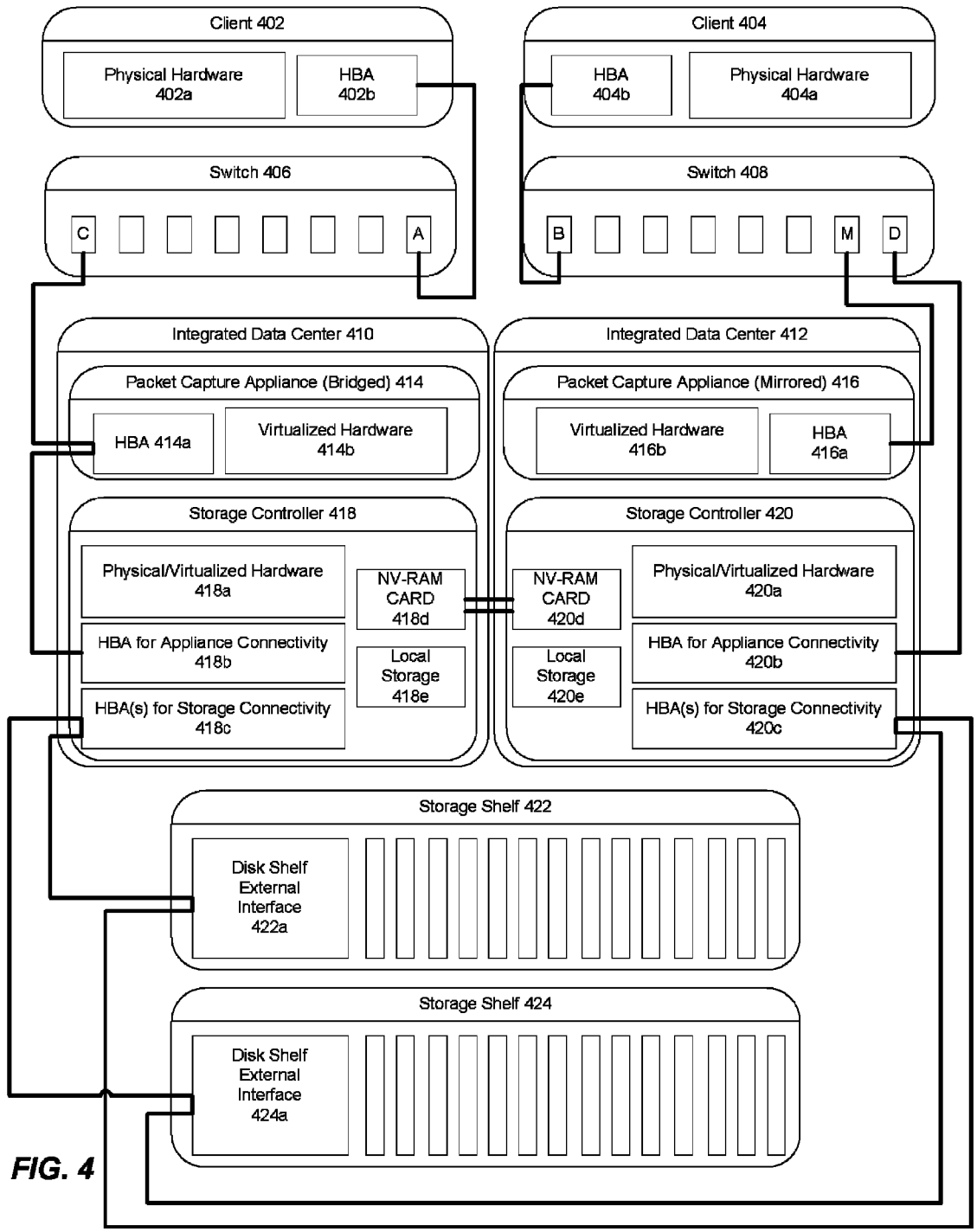
FIG. 4 is a schematic block diagram illustrating an application of the integrated data center in accordance with aspects of the present invention.

Eventually, each application component is associated with an HBA and ready for use within the integrated data center. Aspects of the present invention couples each appliance HBA and corresponding appliance component to a storage controller HBA associated with the storage controller component (310). This connects the application HBA associated with each instance of application component to the HBA associated with the storage controller component and eventually the storage devices within the storage shelf. Connecting the appliance components to the storage controller in this manner provides high performance data throughput to and from the storage devices. To facilitate the data transfer, aspects of the present invention enable access to the storage controller component and storage devices through the appliance HBA associated with the appliance component and virtualized instance of the hardware. (312) The access may be enabled by providing passwords or keys to allow data transfer between applications associated with an appliance component and the storage devices. The applications on the appliance component may include one or more applications including: Exchange email services, POP/Imap electronic-mail (email), web-based email services, electronic commerce systems, document management services, advertising related services and social networking services Accordingly, FIG. 4 is a block diagram illustrating a packet capture solution using the integrated data center in accordance with aspects of the present invention. This is just one example use of the integrated data center configured and loaded with appliances for a specific use. As illustrated, a solution using the integrated data center offers flexibility through hardware virtualization and high-performance through exclusive connections to HBAs. With two HBAs (or multi-ported HBAs) dedicated to each storage controller, the remaining HBAs on the computer platform may be dedicated for use by appliances delivering application services. If dedicated HBAs for use by appliances delivering application services are not available on the computer platform, an alternate implementation may allow appliances to multiplex HBA access on demand as long as appliances sharing HBAs are not active simultaneously.

The integrated data centers 410/412 in FIG. 4 provide a storage controller and a specialized appliance for doing on-demand packet capture. Client 402 and client 404 are connected through switch 406 and switch 408 and then to the integrated data center 410 and integrated data center 412. In support of high-availability (HA), storage shelf 422 and storage shelf 424 both have multi-port interfaces and are likewise coupled to several different HBA ports within the respective integrated data centers 410 and 412.

In this example, integrated data center 410 includes a packet capture appliance 414 running on virtualized hardware 414b while storage controller 418 may be running on hardware 418a or virtualized hardware 418a from the underlying computer platform. Virtualized hardware 414b used by packet capture appliance 414 has an exclusive connection to HBA 414a facilitated using the I/O pass-through feature supported by the underlying processor or virtualization service such as VMDirectPath I/O from VMWARE®.

Storage controller 418 has an exclusive connection to HBA 418b to exchange data with various appliances and also an exclusive connection to HBA 418c to exchange data with storage shelf 422 and storage shelf 424. Storage shelf external interface 422a and storage shelf external interface 424a support HA with multiport connectivity to storage controller 418 and storage controller 420. Integrated data center 412 serves as the HA pair to integrated data center 410 and has a similar configuration. Packet capture appliance 416 runs on virtualized hardware 416b and has an exclusive connection with HBA 416a while storage controller 420 runs on physical/virtualized hardware 420a and has two exclusive connections to HBA 420b and HBA 420c for the exchange of data with appliances and storage shelves respectively.

In operation, packet capture may occur using packet capture appliance 414 in a bridge mode or packet capture appliance 416 in mirror mode.

In bridge mode, packets stream bidirectionally between client 402 and switch 406 through port A and onto integrated data center 410 from port C. Packet capture appliance 414 operating in bridged mode passes the packet traffic to storage controller 418. Software associated with packet capture appliance 414 captures and analyzes packets passing through the HBA 414a interface.

As an alternate solution, packet capture appliance 416 operates in mirror mode. In one implementation, mirror mode as illustrated in FIG. 4 streams packets bidirectionally between client 404 and switch 408 over port B indicated on switch 408. Port M on switch 408 has a mirroring feature that mirrors the traffic through port D to HBA 420b on the storage controller while also mirroring traffic with HBA 416a over port M. In comparison to bridging the data across the interface of HBA 414a, the mirror mode is less intrusive to the overall environment as it does not disrupt the traffic sent through port D on switch 408. Additional software on either storage controller 418 or 420 can be created to capture packet traffic in either bridged or mirrored mode, capture traffic as desired, perform automated performance analysis, or save data for later retrieval and diagnostic purposes. In general, aspects of the present invention can be used to capture protocols such as TCP/IP, NFS, iSCSI, FCoE without deploying a traditional external analyzers or capture computer. Indeed, implementing a 10G HBA in the packet capture appliance 414 or 416 enables capturing of protocols such as TCP/IP, NFS, iSCSI, FCoE that are traditionally performed by deploying an external analyzer or capture computer Implementing appliances on virtualized hardware within the computer platform leads to savings due to the elimination of external clients, reduction of data center footprint (rack space) and less power. This particular implementation in FIG. 4 demonstrates an HA solution configuration with redundancies between connections of NV-RAM Card 418d and NVRAM Card 420d. Moreover, integrated data center 410 speeds up deployment of complex solutions as they can be configured using virtualization and storage in accordance with aspects of the present invention.

Figure 5:
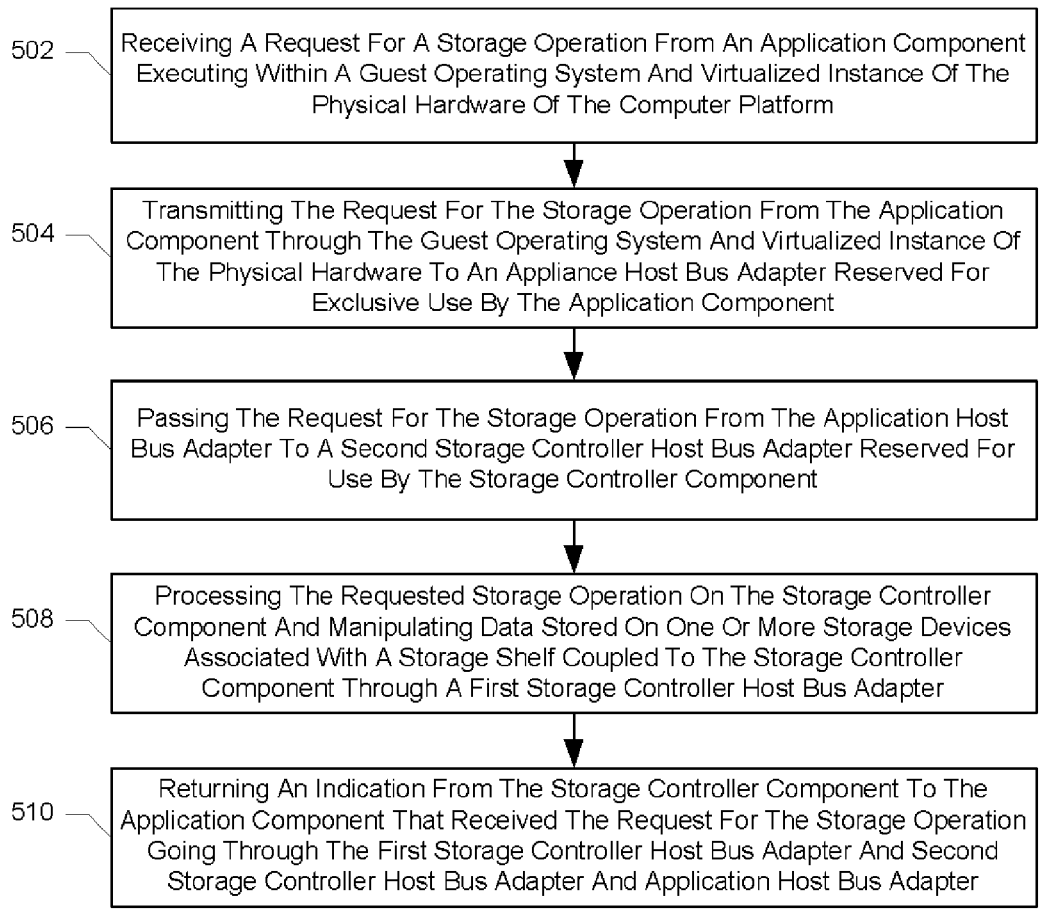
FIG. 5 is a flowchart diagram providing the operations used by an application component to perform a storage operation through a storage controller in accordance with aspects of the present invention.

FIG. 5 is a flowchart diagram providing the operations used by an application component to perform a storage operation through a storage controller component in accordance with aspects of the present invention. Generally, an application component receives a request for a storage operation while executing within a guest operating system and virtualized instance of the hardware of the computer platform. (502). For example, the application component may execute a database transaction and need to modify some information already stored in a database located on the storage devices of a data shelf managed by a storage controller component. The database application running on a virtualized instance of the hardware uses aspects of the present invention to effectuate the requested storage operation. It is contemplated that storage operations may include read, write, delete or any other manipulation of data on a storage device.

Next, aspects of the present invention transmit the storage operation request from the application component to an appliance HBA reserved for exclusive use by the application component. This request may also travel through the guest operating system and virtualized instance of the hardware. (504) Because the HBA is not shared with other virtual instances of the hardware or virtual machines, the data request and data travels rapidly between the application and appliance HBA.

The request for the storage operation is then passed from the application HBA to a second storage controller HBA reserved for exclusive use by the storage controller component. (506) Once again, the storage controller HBA is for exclusive use by the storage controller component thus keeping the high throughput rate between the application component and the storage controller component.

The storage controller component then processes the requested storage operation and manipulates data stored on one or more storage devices associated with a storage shelf. The request and data continues to travel at a high throughput rate between the storage controller component and the storage devices as the first storage controller HBA is used exclusively by the storage controller component and is not shared. (508) Depending on the results, aspects of the present invention may return an indication from the storage controller component to the application component that received the request for the storage operation. For example, the indication may provide status of the request, data associated with the request or a combination of status and data associated with the storage operation. In general, the indication sent to the application component will return over the reverse path from the storage shelf—it will travel from the first storage controller HBA through the storage controller component then the second storage controller HBA and back to the application HBA and eventually the associated application component. (510)

In general, implementations of the invention can be implemented in digital electronic circuitry, or in computer hardware, firmware, software, or in combinations of them. Apparatus of the invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage environment, at least one input device, and at least one output device. Each computer program can be implemented in a high level procedural or object oriented programming language, or in assembly or machine language if desired; and in any case, the language can be a compiled or interpreted language. Suitable processors include, by way of example, both general and special purpose microprocessors. Generally, the processor receives instructions and data from a read only memory and/or a random access memory. Also, a computer will include one or more secondary storage or mass storage devices for storing data files; such devices include magnetic disks, such as internal hard disks and removable disks; magneto optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto optical disks, DVD and CD ROM disks. Any of the foregoing can be supplemented by, or incorporated in, ASICs (application specific integrated circuits).

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents. For example, some implementations of the present invention rely upon hardware support for virtualization however it is contemplated that aspects of the present invention may also work using virtualization software having lesser degrees of processor support.

This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Unless otherwise specified, steps of a method claim need not be performed in the order specified. The invention is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A method of integrating a storage controller and one or more appliances onto a computer platform having hardware, comprising:
    configuring a storage controller component to execute on the computer platform providing the storage controller component with exclusive access to a first physical storage controller host bus adapter physically coupled to one or more storage devices permanently;
    provisioning a virtualized instance of the hardware from the computer platform to deliver one or more application services from one or more corresponding application components;
    associating a physical appliance host bus adapter from the computer platform to an appliance component along with giving control of the physical appliance host bus adapter to the appliance component through the virtualized instance of the hardware; and
    operatively coupling the physical appliance host bus adapter associated with the appliance component permanently with a second physical storage controller host bus adapter associated with the storage controller component.

2. The method of claim 1 further comprising:
enabling access to the storage controller component and the one or more storage devices through each physical appliance host bus adapter associated with the appliance component and virtualized instance of the hardware from the computer platform.

3. The method of claim 1 wherein the hardware of the computer platform includes a processor having built-in virtualization support for provisioning a virtualized instance of the hardware on the computer platform and an exclusive association of the physical appliance host bus adapter to the virtualized instance.

4. The method of claim 1 wherein the one or more storage devices are associated with a storage shelf being controlled by the storage controller component.

5. The method of claim 1 wherein the computer platform having the storage controller and appliances are part of a "cloud computing" platform delivering applications and storage in a Software as a Service (SaaS) model.

6. The method of claim 1 wherein the execution of the storage controller occurs on the hardware of the computer platform.

7. The method of claim 1 wherein the execution of the storage controller occurs on a virtualized instance of the hardware of the computer platform.

8. The method of claim 1 wherein the appliance component for delivering one or more application services includes functionality selected from a set of application services including:
Exchange email services, POP/Imap electronic-mail (email), web-based email services, electronic commerce systems, document management services, advertising related services and social networking services.

9. The method of claim 1 wherein the provisioning further comprises:
executing the appliance component within a guest operating system and the virtualized instance of the hardware.

10. The method of claim 1 wherein the appliance component performs a packet capture solution for packets exchanged with the storage controller component.

11. An apparatus for integrating a storage controller and one or more appliances onto a virtualized computer platform, comprising:
a processor capable of executing instructions;
a first physical storage controller host bus adapter physically coupled permanently to one or more storage devices;
a second physical storage controller host bus adapter physically coupled permanently to a set of one or more physical appliance host bus adapters;
a memory containing instructions when executed on the processor configures storage controller component to execute on hardware of a computer platform providing the storage controller component with access to the first physical storage controller host bus adapter and one or more storage devices, provisions a virtualized instance of the hardware from the computer platform to deliver one or more application services from corresponding one or more appliance components, associates a physical appliance host bus adapter from the computer platform exclusively to the appliance component and passes control of the physical appliance host bus adapter to the appliance component through the virtualized instance of the hardware, and couples the physical appliance host bus adapter associated with the virtualized instance of the hardware and corresponding appliance component with the second physical storage controller host bus adapter associated with the storage controller.

12. The apparatus of claim 11 further comprising instructions when executed enable access to the storage controller component and one or more storage devices through the physical appliance host bus adapter associated with the appliance component and virtualized instance of the hardware.

13. The apparatus of claim 11 wherein the processor includes built-in virtualization support for provisioning a virtualized instance of the hardware on the computer platform and facilitates an exclusive connection between a physical appliance host bus adapter and the virtualized instance of the hardware.

14. The apparatus of claim 11 wherein the one or more storage devices are associated with a storage shelf being controlled by the storage controller component.

15. The apparatus of claim 11 wherein the computer platform having the storage controller and appliances are part of a "cloud computing" platform delivering applications and storage in a Software as a Service (SaaS) model.

16. The apparatus of claim 11 wherein the execution of the storage controller component occurs on a virtualized instance of the hardware of the computer platform.

17. The apparatus of 11 wherein the appliance component for delivering one or more application services includes functionality selected from a set of application services including:
Exchange email services, POP/Imap Electronic-mail (email), web-based email services, Document Management Services, Advertising related services and Social networking services.

18. A method of performing a storage operation on one or more storage devices through a storage controller component within a computer platform having hardware, comprising:
receiving a request for a storage operation from an application component executing within a virtualized instance of the hardware of a computer platform;
transmitting the request for the storage operation from the application component through the virtualized instance of the hardware to a physical appliance host bus adapter reserved for exclusive use by the application component;
passing the request for the storage operation from the physical application host bus adapter to permanent connection with a second physical storage controller host bus adapter reserved for exclusive use by the storage controller component; and
processing the requested storage operation on the storage controller component and manipulating data stored on one or more storage devices permanently coupled to the storage controller component through a first physical storage controller host bus adapter.

19. The method of claim 18 further comprising:
returning an indication from the storage controller component back to the application component that received the request for the storage operation through the first physical storage controller host bus adapter and second physical storage controller host bus adapter and physical application host bus adapter.

20. The method of claim 18 wherein the hardware of the computer platform includes a processor having built-in virtualization support for provisioning a virtualized instance of the hardware on the computer platform and facilitates an exclusive connection of the physical appliance host bus adapter to the virtualized instance.

21. The method of claim 18 wherein receiving the request further comprises:
   executing the appliance component within a guest operating system and the virtualized instance of the hardware.

* * * * *